(12) United States Patent
Strengert et al.

(10) Patent No.: US 9,221,441 B2
(45) Date of Patent: Dec. 29, 2015

(54) CONTROL DEVICE FOR A BRAKE SYSTEM OF A VEHICLE, BRAKE SYSTEM FOR A VEHICLE AND METHOD FOR OPERATING A BRAKE SYSTEM OF A VEHICLE

(75) Inventors: Stefen Strengert, Stuttgart (DE); Michael Kunz, Steinheim an der Murr (DE); Thorsten Maucher, Heidelberg (DE)

(73) Assignee: ROBERT BOSCH GMBH, Stuttgart (DE)

(\*) Notice: Subject to any disclaimer, the term of this patent is extended or adjusted under 35 U.S.C. 154(b) by 0 days.

(21) Appl. No.: 14/236,881

(22) PCT Filed: Jun. 4, 2012

(86) PCT No.: PCT/EP2012/060485
§ 371 (c)(1),
(2), (4) Date: May 16, 2014

(87) PCT Pub. No.: WO2013/017314
PCT Pub. Date: Feb. 7, 2013

(65) Prior Publication Data
US 2014/0244127 A1  Aug. 28, 2014

(30) Foreign Application Priority Data

Aug. 4, 2011 (DE) .......................... 10 2011 080 431

(51) Int. Cl.
*G06F 7/70* (2006.01)
*B60T 8/26* (2006.01)
(Continued)

(52) U.S. Cl.
CPC . *B60T 8/266* (2013.01); *B60T 1/10* (2013.01); *B60T 7/042* (2013.01); *B60T 7/12* (2013.01); *B60T 8/1755* (2013.01); *B60T 8/17616* (2013.01); *B60T 8/268* (2013.01); *B60T 8/326* (2013.01); *B60T 8/341* (2013.01); *B60T 8/3655* (2013.01); *B60T 8/4081* (2013.01);
(Continued)

(58) Field of Classification Search
CPC ........ B60T 8/00; B60T 8/3655; B60T 13/686
See application file for complete search history.

(56) References Cited

U.S. PATENT DOCUMENTS

| 5,568,962 A | 10/1996 | Enomoto et al. |
| 2010/0276239 A1* | 11/2010 | Wuerth et al. ................. 188/358 |

FOREIGN PATENT DOCUMENTS

| DE | 196 04 134 | 2/1998 |
| DE | 103 16 090 | 10/2004 |

(Continued)

OTHER PUBLICATIONS

International Search Report for PCT/EP2012/060485, dated Mar. 16, 2012.

*Primary Examiner* — Michael D Lang
(74) *Attorney, Agent, or Firm* — Kenyon & Kenyon LLP

(57) ABSTRACT

In a control device for a brake system of a vehicle, given an actuation of a brake actuating element, a buildup of brake pressure is prevented at least in a first wheel brake caliper of a first brake circuit, a first wheel inlet valve of the first wheel brake caliper being controlled to a partly open state, and a first wheel outlet valve of the first wheel brake caliper being kept in a partly open state, a second wheel inlet valve of a second wheel brake caliper of the first brake circuit being controlled to a partly open state, and a second wheel outlet valve of the second wheel brake caliper being controlled to a closed state, in such a way that a brake pressure can be built up in the second wheel brake caliper.

12 Claims, 8 Drawing Sheets

(51) Int. Cl.
*B60T 1/10* (2006.01)
*B60T 7/04* (2006.01)
*B60T 7/12* (2006.01)
*B60T 8/1755* (2006.01)
*B60T 8/1761* (2006.01)
*B60T 8/32* (2006.01)
*B60T 8/34* (2006.01)
*B60T 8/36* (2006.01)
*B60T 8/40* (2006.01)
*B60T 8/42* (2006.01)
*B60T 8/48* (2006.01)
*B60T 13/14* (2006.01)
*B60T 13/66* (2006.01)
*B60T 13/68* (2006.01)
*B60T 13/74* (2006.01)
*B60W 10/184* (2012.01)
*B60W 30/18* (2012.01)
*B60W 10/188* (2012.01)
*B60W 10/192* (2012.01)

(52) U.S. Cl.
CPC ............ *B60T 8/4275* (2013.01); *B60T 8/4872* (2013.01); *B60T 13/146* (2013.01); *B60T 13/662* (2013.01); *B60T 13/686* (2013.01); *B60T 13/74* (2013.01); *B60W 10/184* (2013.01); *B60W 30/18127* (2013.01); *B60T 2220/04* (2013.01); *B60T 2270/604* (2013.01); *B60W 10/188* (2013.01); *B60W 10/192* (2013.01); *B60Y 2300/89* (2013.01)

(56) References Cited

FOREIGN PATENT DOCUMENTS

| | | |
|---|---|---|
| DE | 10 2006 033 890 | 1/2008 |
| DE | 10 2007 030 441 | 1/2009 |
| DE | 10 2008 004 201 | 7/2009 |
| DE | 10 2008 002 345 | 12/2009 |
| DE | 10 2009 001 401 | 9/2010 |
| DE | 10 2009 028 028 | 2/2011 |
| JP | 2006131122 A | 5/2006 |
| JP | 2007112426 A | 5/2007 |
| JP | 2011051493 A | 3/2011 |
| WO | WO 2005 102 806 | 11/2005 |
| WO | WO 2010 069 655 | 6/2010 |
| WO | WO 2010 069 659 | 6/2010 |

\* cited by examiner

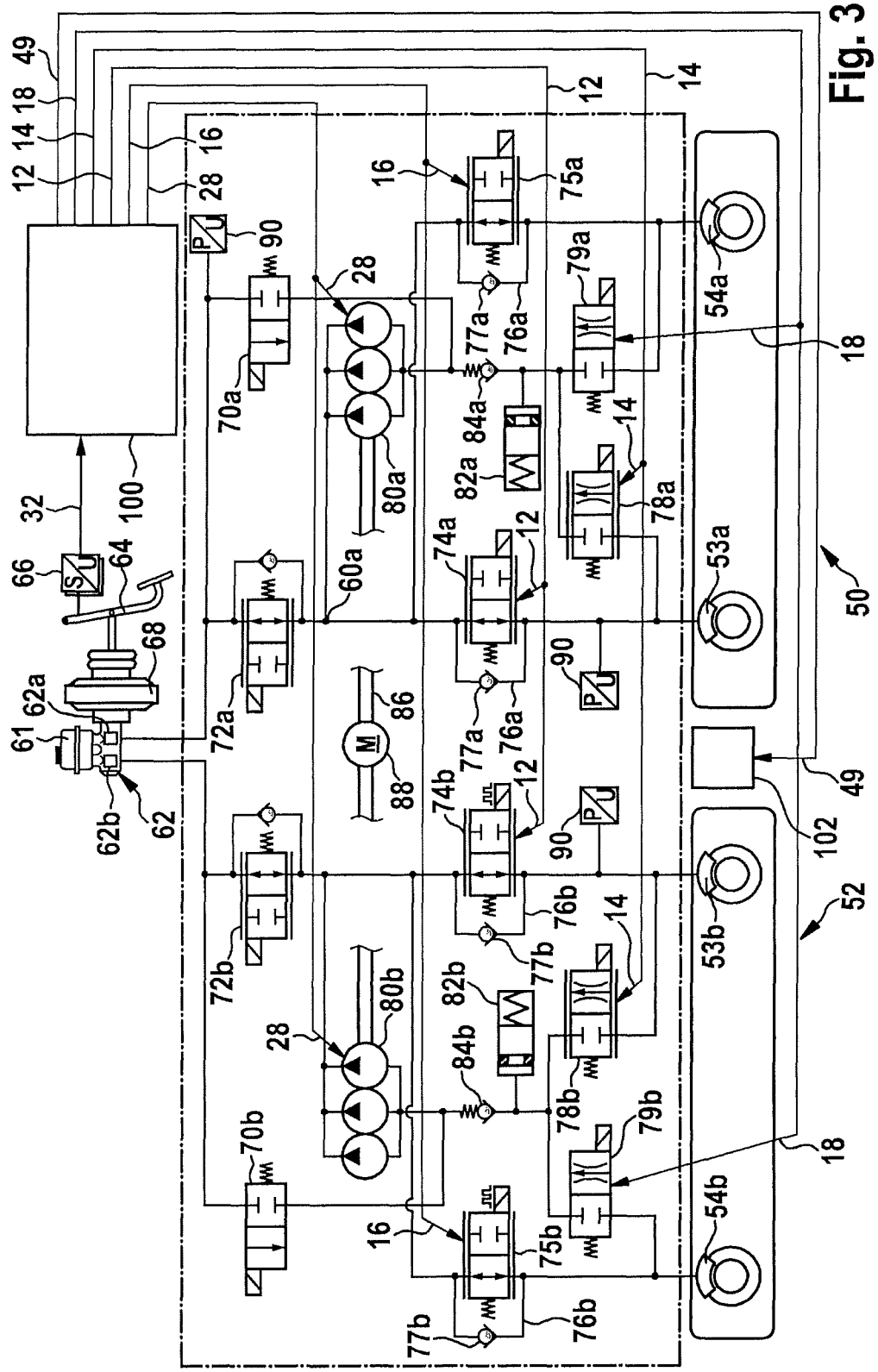

CONTROL DEVICE FOR A BRAKE SYSTEM OF A VEHICLE, BRAKE SYSTEM FOR A VEHICLE AND METHOD FOR OPERATING A BRAKE SYSTEM OF A VEHICLE

BACKGROUND OF THE INVENTION

1. Field of the Invention

The present invention relates to a control device for a brake system of a vehicle. The present invention also relates to a brake system for a vehicle. In addition, the present invention relates to a method for operating a brake system of a vehicle and to a method for operating a brake system of a vehicle having a diagonal brake circuit configuration.

2. Description of the Related Art

In published German patent application document DE 196 04 134 A1, a method and a device are described for controlling a brake system of a motor vehicle having an electric drive. When the vehicle is braked using the electric drive for the simultaneous charging of a battery, the hydraulic braking moment exerted on at least one wheel by the at least one wheel brake cylinder of the hydraulic brake system is to be reduced/deactivated despite an actuation of the brake pedal. For this purpose, the pressure medium displaced from the master brake cylinder to the wheel brakes by the actuation of the brake pedal is to be counteracted in that, by opening the outlet valves of the hydraulic brake system, the pressure medium displaced from the master brake cylinder is guided via the at least one wheel brake cylinder into at least one storage chamber. In this way, a regenerative braking carried out by the electric drive is to be capable of being masked.

BRIEF SUMMARY OF THE INVENTION

The present invention creates a brake system that represents an expanded simple system. Through the expansion, the disadvantage of greatly limited recuperative efficiency of the known simple systems can be remedied without having to make a large work outlay, compared to a conventional brake system, in order to achieve the expansion. Thus, via the present invention it is possible to realize an adequate recuperative efficiency of a brake system in an economical fashion, i.e. with minimal additional costs.

In particular, the present invention makes it possible to realize a brake system having an advantageous recuperative efficiency whose use is not limited to a vehicle having a brake circuit configured in accordance with axles. Instead, the control device according to the present invention, and the corresponding method for vehicle having a diagonal brake circuit, in which the wheels allocated to a common brake circuit are situated on different vehicle axles, can be advantageously used. A vehicle having a diagonal brake configuration can also be described by saying that the wheels allocated to a common brake circuit are situated diagonally on the vehicle. Thus, the present invention represents an advantageous expansion of a recuperable brake system for vehicles having a diagonal brake circuit configuration.

In comparison with the existing art, the control device according to the present invention and the corresponding method also offer a masking of a generator braking moment when there is a comparatively strong braking of the vehicle. As is explained in more detail below, through the expansion of the usability of the masking function, a faster charging of a vehicle battery can be realized. Thus, the present invention advantageously contributes to the reduction of energy consumption and exhaust gas emission during the driving of a vehicle.

BRIEF DESCRIPTION OF THE DRAWINGS

FIG. 3 shows a schematic overall representation of a second specific embodiment of the brake system.

DETAILED DESCRIPTION OF THE INVENTION

Figure 1:
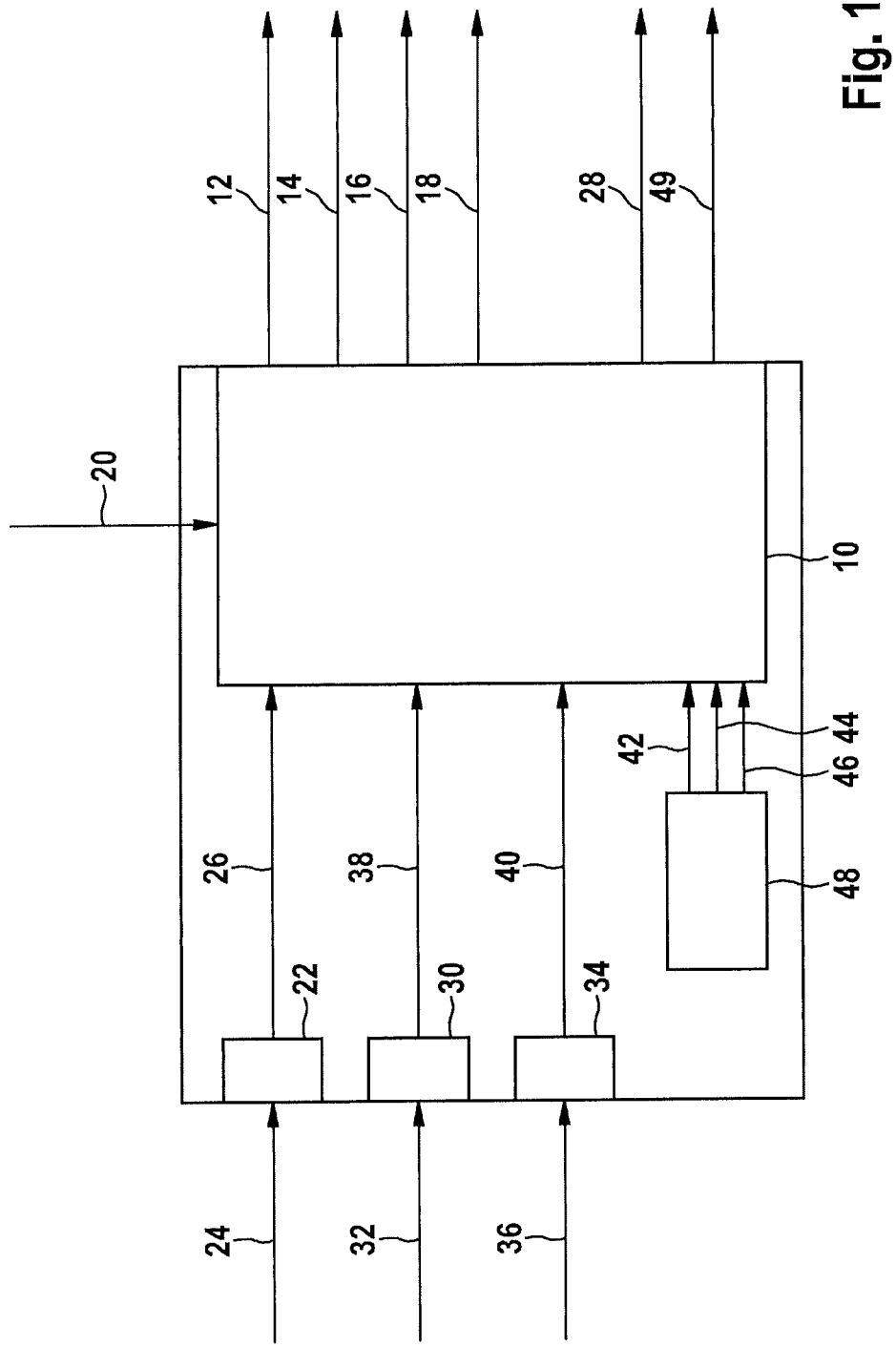
FIG. 1 shows a schematic representation of a specific embodiment of the control device.

FIG. 1 shows a schematic representation of a specific embodiment of the control device.

The control device shown schematically in FIG. 1 is designed for the controlling of components of a brake system (not shown) of a vehicle. The possible design of the components of the brake system is described in more detail in relation to the following Figures.

The control device has a controller 10 by which the brake system can be controlled (at least) to a first operating mode in which, when a driver actuates a brake actuating element situated on the brake system, a buildup of brake pressure is (substantially) prevented at least in a first wheel brake caliper of a first brake circuit of the brake system. This can also be described by saying that despite an actuation strength not equal to zero of the actuation of the brake actuating element, a buildup of brake pressure is (substantially) prevented at least in the first wheel brake caliper of the first brake circuit of the brake system. For this purpose, controller 10 is designed to keep a first wheel inlet valve of the first wheel brake caliper in an at least partly open state at least at times during the first operating mode, using a first valve control signal 12, and to keep a first wheel outlet valve of the first wheel brake caliper in an at least partly open state during the first operating mode, using a second valve control signal 14. Thus, preferably the first wheel outlet valve remains in the at least partly open state during the first operating mode.

As is explained in more detail below, however, during the first operating mode the first wheel inlet valve can be controlled, at least at times, to a closed state using first valve control signal 12. Moreover, using controller 10, in addition a second wheel inlet valve of a second wheel brake caliper of the first brake circuit can be controlled, during the first operating mode, to an at least partly open state using a third valve control signal 16, and a second wheel outlet valve of the second wheel brake caliper can be controlled, during the first operating mode, to a closed state using a fourth valve control signal 18. In this way, it can be brought about that during the buildup of brake pressure in the first wheel brake caliper, despite the presence of an actuation strength not equal to zero a brake pressure (not equal to zero) can be (substantially) prevented from building up in the second wheel brake caliper.

In this way, the suppressed braking action of the first wheel brake caliper can be used to make use of a generator to charge a vehicle battery without exceeding a target overall deceleration of the vehicle specified by the driver. Likewise, via the braking of the vehicle into the second wheel brake caliper that is at the same time brought about by controller 10, it can be ensured that when actuating the brake actuating element the driver does not perceive any unusual/disturbing brake actuation feeling (pedal feeling), despite the suppressed braking action of the first wheel brake caliper (and the activation of the generator). In addition, despite the reliable masking of the generator braking moment and the maintenance of the preferred (standard) brake actuation feeling during the masking, controller 10 permits a comparatively frequent use of the generator for fast charging of the vehicle battery.

Preferably, controller 10 is also designed to recognize a deviation of a determined or derived actual pressure quantity relating to the brake pressure present in the second wheel brake caliper and/or of the internal pressure present in the master brake cylinder from a specified target pressure quantity. In this case, during the controlling of the brake system to the first operating mode controller 10 can in addition be designed to use first valve control signal 12 to control the first wheel inlet valve from the closed state to the partly open state, taking into account the deviation.

Preferably, the controlling of the first wheel inlet valve by first valve control signal 12 takes place in such a way that the brake pressure in the second wheel brake caliper, and/or the internal pressure in the master brake cylinder, can be reduced by a pressure difference corresponding to the deviation. The pressure reduction in the second wheel brake caliper can be carried out in this way even though the buildup of brake pressure in the first wheel brake caliper controlled to the first operating mode is (substantially) prevented despite the presence of an actuation strength not equal to zero.

The target pressure quantity can be specified by a comparison signal 20 of controller 10 of a vehicle control system. An advantageous possibility for determining the target pressure quantity using controller 10 is further specified below.

Controller 10 can also have a sensor or receiver device 22 by which an actual pressure signal 24 can be received by a sensor, or an actual pressure value can be determined relating to the brake pressure present in the second wheel brake caliper. An actual pressure quantity signal 26, corresponding to actual pressure signal 24 or to the actual pressure value, and having the determined actual pressure quantity, can then be provided to controller 10 by sensor or receiver device 22. Alternatively, controller 10 can also be designed to derive a probable actual pressure quantity taking into account the control signals outputted by controller 10.

Preferably, controller 10 is also designed to output a pump control signal 28 to a pump device of the first brake circuit during the controlling of the brake system to the first operating mode, taking into account the deviation of the determined or derived actual pressure quantity from the specified target pressure quantity. Using pump control signal 28, the pump device can be controlled in such a way that a brake fluid volume corresponding to the deviation can be pumped by the pump device from a storage chamber into the first brake circuit and/or the master brake cylinder. In this way, the brake pressure in the second wheel brake caliper and/or the internal pressure in the master brake cylinder can be increased.

Through the increasing and reduction of the brake pressure present in the second wheel brake caliper, the hydraulic braking moment exerted by the second wheel brake caliper on an associated wheel can be set corresponding to a desired target braking moment. In particular, in this way a change over time of the generator braking moment can be compensated. Likewise, in this way it can be ensured that the driver experiences an advantageous (standard) brake actuation feeling when braking into the master brake cylinder.

In an advantageous development, the control device has a first receiver device 30 by which a provided brake actuating strength output signal 32 can be received that relates to an actuation strength of an actuation of a brake actuating element situated on or connected to the brake system. Brake actuation strength output signal 32 can for example be an output signal of a brake force sensor, a brake pressure sensor, and/or a brake path sensor. The information that can be received via brake actuation strength output signal 32 relating to the actuation strength can include a braking force exerted on a brake actuating element (not shown), a corresponding brake pressure, and/or a brake actuation path by which at least a sub-component of the brake actuating element is displaced. However, the receivable brake actuation strength output signal 32 is not limited to the examples listed here.

The control device can also have a second receiver device 34 by which a provided generator braking moment output signal 36 is receivable that relates to a generator braking moment that is or can be exerted by a generator. Generator braking moment output signal 36 can for example include an item of information concerning whether the vehicle speed is suitable for the use of the generator with a particular generator braking moment, and/or whether a charge level of a battery that can be charged by the generator can be further increased. Likewise, generator braking moment output signal 36 can indicate the generator braking moment currently exerted by the generator.

A brake actuating strength signal 38, corresponding to brake actuation strength output signal 32, and/or a generator brake moment signal 40 corresponding to generator brake moment output signal 36 can be forwarded to controller 10. Controller 10 is preferably designed to compare brake actuation strength signal 38 to a specified threshold strength signal 42, and/or to compare generator brake moment signal 40 to a specified minimum brake moment signal 44. If brake actuation strength signal 38 is above threshold strength signal 42, and/or generator brake moment signal 40 is above minimum brake moment signal 44, then controller 10 controls the brake system to the first operating mode, using above-described valve control signals 12 through 18 (and preferably using pump control signal 28). Otherwise, controller 10 controls the brake system (using other output signals) to at least one further operating mode.

Preferably, controller 10 is additionally designed to compare brake actuation strength signal 38 to a specified minimum strength signal 46. In this case, controller 10 can control the brake system to a second operating mode, if at least brake actuation strength signal 38 is between minimum strength signal 46 and threshold strength signal 42. Preferably, the second operating mode is designed so that in the second operating mode, despite an actuation strength not equal to zero of the actuation of the brake actuating element situated on the brake system, a buildup of brake pressure is (substantially) prevented both in the first wheel brake caliper and also in the second wheel brake caliper. This can be brought about by, in the second operating mode, controlling the first wheel inlet valve to the closed state, controlling the first wheel outlet valve to a closed state, controlling the second wheel inlet valve to the at least partly open state, and controlling the second wheel outlet valve to an at least partly open state, using controller 10.

By controlling the brake system to the second operating mode, a buildup of pressure in the two wheel brake calipers of the first brake circuit (and in the master brake cylinder) can be prevented/reduced despite an actuation of the brake actuating element by the driver. In this way, the omitted braking action of the two wheel brake calipers of the first brake circuit can be used to put the generator into use without exceeding the vehicle deceleration desired by the driver. In this way, a vehicle battery can be charged even given a light braking. However, it is to be noted that the design of controller 10 for the controlling of the brake system to the second operating mode is optional.

Threshold strength signal 42, minimum brake moment signal 44, and/or minimum strength signal 46 can be provided to controller 10 for example by a storage device 48. As is stated in more detail below, threshold strength signal 42 can correspond in particular to an actuation strength beginning from which a force-transmitting contact is present between the brake actuating element and a displaceable piston of a master brake cylinder of the brake system controlled by the control device, a transmission of force between the brake actuating element and the displaceable piston being prevented given an actuation strength below the actuation strength corresponding to the threshold strength signal. The advantages of such a specification/definition of the threshold strength signal are described in more detail below.

Minimum brake moment signal 44 can correspond to a generator braking moment beginning from which an activation of the generator is worthwhile. However, minimum braking moment signal 44 can also correspond to a generator braking moment of zero. In this case, a provision of minimum braking moment signal 44 to controller 10 can be omitted. Minimum strength signal 46 can correspond to a minimum actuation strength given an actuation of the brake actuating element beginning from which a buildup of brake pressure in the two wheel brake calipers of the first brake circuit is to be prevented. However, minimum strength signal 46 can also correspond to an actuation strength equal to zero. In this case, it is not necessary to provide minimum strength signal 46 to controller 10 using storage device 48.

In addition, controller 10 can also be designed to determine the target pressure quantity relating to a target brake pressure in the second wheel brake caliper and/or in the master brake cylinder and/or to define a target mode of the generator, taking into account brake actuation strength signal 38 and a generator brake moment signal 40 relating to a generator braking moment that can be exerted by the generator. A generator control signal 49 corresponding to the determined target mode can subsequently be outputted to the generator by controller 10. In this way, the controller can also take over the determination of the division of the overall deceleration desired by the driver into a hydraulic braking moment and the generator braking moment. However, the control device described here is not limited to such a design of controller 10.

Particular advantages result from the advantageous interaction of controller 10 with a brake system. Therefore, reference is made to the following description of a brake system for the more precise explanation of these advantages.

FIGS. 2A through 2G show a schematic overall representation, three schematic partial representations, and three coordinate systems for the explanation of a first specific embodiment of the brake system.

Figure 2A:
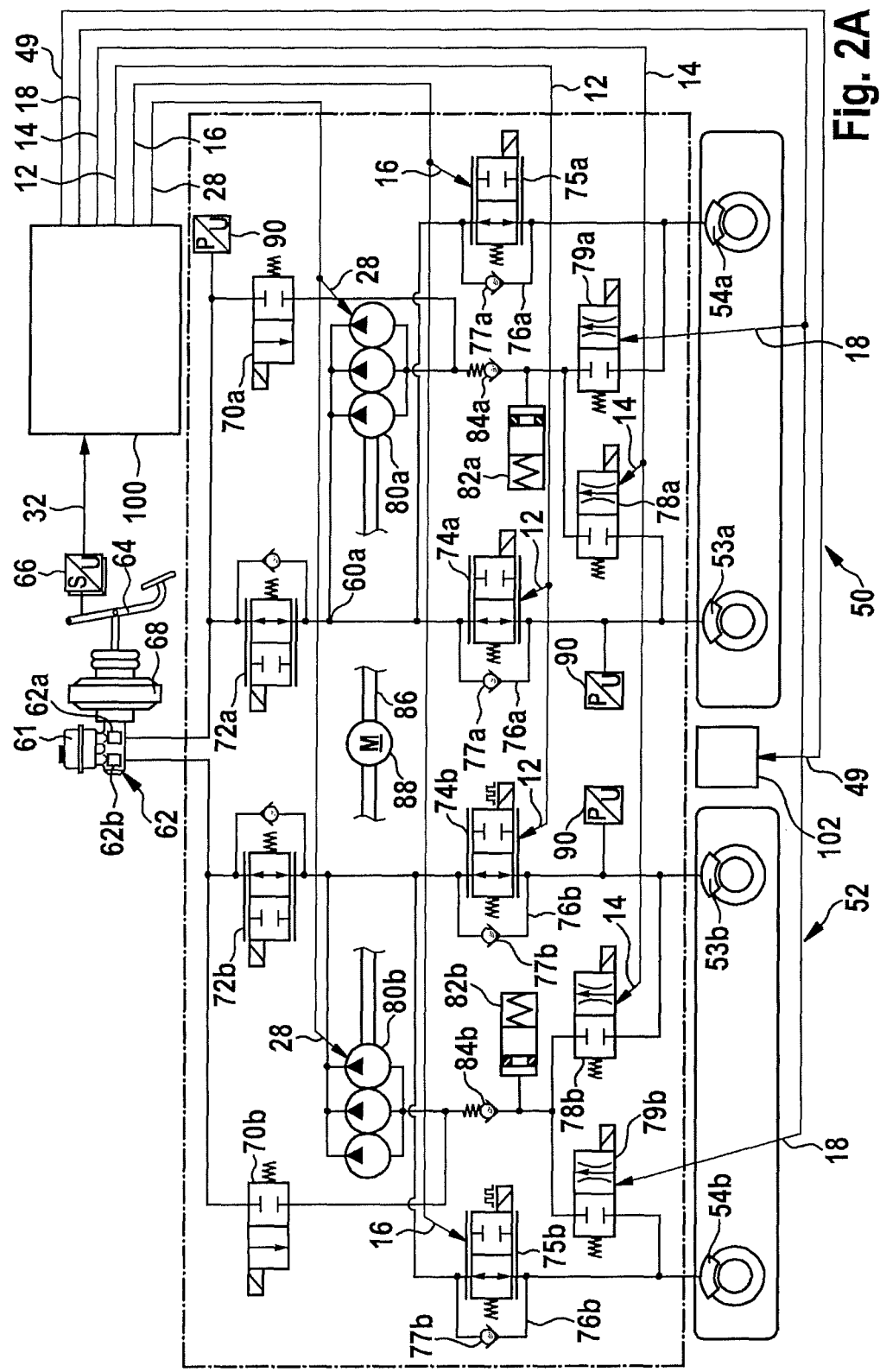
FIGS. 2A through 2G show a schematic overall representation, three schematic partial representations, and three coordinate systems for the explanation of a first specific embodiment of the brake system.

FIG. 2A shows a schematic overall representation of a specific embodiment of a brake system having the control device.

The brake system shown schematically in FIG. 2A can be used advantageously for example in a hybrid vehicle and in an electric vehicle. However, the applicability of the brake system described below is not limited to use in a hybrid vehicle or in an electric vehicle.

The brake system has a first brake circuit 50 having a first wheel brake caliper 53a and a second wheel brake caliper 54b. Optionally, the brake system also has a second brake circuit 52 having a third wheel brake caliper 53b and a fourth wheel brake caliper 54b. Preferably, the brake system is in this case designed for a vehicle having a diagonal brake circuit configuration. In this case, first wheel brake caliper 53a and third wheel brake caliper 53b are allocated to a first vehicle axle, while second wheel brake caliper 54a and fourth wheel brake caliper 54b are allocated to another vehicle axle. The wheels allocated to a brake circuit 50 and 52 can in particular be situated diagonally on the vehicle. For example, first wheel brake caliper 53a and third wheel brake caliper 53b can be allocated to the front axle, while second wheel brake caliper 54a and fourth wheel brake caliper 54b are allocated to the rear axle. The brake system described below is however not limited to a diagonal brake circuit configuration. Instead, the brake system can also be used if the wheels allocated to a common brake circuit 50 or 52 are arranged by axle or are situated on one side of the vehicle.

The brake system has a master brake cylinder 62 that can be realized for example as a tandem master brake cylinder. Master brake cylinder 62 can have at least one displaceable master brake cylinder piston (not shown) that can be displaced at least partially into at least one pressure chamber 62a or 62b of master brake cylinder 62. Preferably, master brake cylinder 62 has a first displaceable piston that can be designated a rod piston and that extends at least partly into a first pressure chamber 62a, allocated to first brake circuit 50, of master brake cylinder 62, and has a second displaceable piston that can be designated a floating piston and that extends at least partly into a second pressure chamber 62b, allocated to second brake circuit 52, of master brake cylinder 62. In a preferred specific embodiment, the floating piston can be displaced in such a way that when the floating piston is displaced in a first direction the first interior volume of first pressure chamber 62a decreases, while the internal volume of second pressure chamber 62b increases. Correspondingly, via a displacement of the floating piston in a second direction the internal volume of first pressure chamber 62a can increase while the internal volume of second pressure chamber 62b decreases. However, the brake system is not limited to the use of a tandem master brake cylinder or to a particular realization of master brake cylinder 62. Master brake cylinder 62 can be connected to a brake medium reservoir 61 via at least one brake fluid exchange opening such as a compensating bore.

The brake system preferably has a brake actuating element 64 situated on master brake cylinder 62, such as a brake pedal. Advantageously, brake actuating element 64 is situated on master brake cylinder 62 in such a way that when brake actuating element 64 is actuated with at least a threshold force, a driver's braking force applied to brake actuating element 64 is capable of being transmitted to at least one displaceable master brake cylinder piston, such as the rod piston and the floating piston, in such a way that the master brake cylinder piston can be displaced by the driver's braking force. Preferably, through this displacement of the master brake cylinder piston an internal pressure is increased in at least one pressure chamber 62a and 62b of master brake cylinder 62.

In the brake system described here, brake actuating element 64 is in addition situated on master brake cylinder 62 in such a way that during the actuation of brake actuating element 64 with an actuation strength not equal to zero but lower than a threshold strength, a transmission of force between brake actuating element 64 and the at least one master brake cylinder piston is prevented. In contrast, although the transmission of the driver's braking force to the at least one displaceable piston is prevented when there is an actuation of brake actuating element 64 with an actuation strength below the threshold strength, when there is an actuation of brake actuating element 64 with an actuation strength equal to or greater than a threshold strength corresponding to the threshold strength signal, at least one displaceable piston of master brake cylinder 62 can be displaced at least partly into this cylinder. This ensures the advantage that, during the actuation of brake actuating element 64 with the actuation strength below the threshold strength, the driver is "decoupled" from master brake cylinder 62 and from the at least one brake circuit 50 and 52 connected thereto, and thus does not sense any feedback effect from the pressure present therein. At the same time, the driver's braking force can be used for a strong braking of the vehicle beginning from an actuation strength greater than the threshold strength. The advantageous applicability of this situation of brake actuating element 64 on master brake cylinder 62 for masking a generator braking moment is described in more detail below. However, the brake system is not limited to such a situation of brake actuating element 64 on master brake cylinder 62.

Preferably, the brake system also includes at least one brake actuating element sensor 66 by which the actuation strength of the actuation of brake actuating element 64 by the driver can be determined. Brake actuating element sensor 26 can include for example a pedal path sensor, a difference path sensor, and/or a rod path sensor. In order to acquire the actuation strength corresponding to the driver's desired braking force, however, a differently realized sensor system may also be used instead of or in addition to the sensor types listed here.

In a preferred specific embodiment, the depicted brake system also has a brake power booster 68, such as a vacuum brake power booster. Instead of a vacuum brake power booster, the brake system can also have a different type of brake power booster 68, such as a hydraulic and/or an electromechanical boosting device. Brake power booster 68 can in particular be a continuously regulable/continuously controllable brake power booster.

Using brake power booster 68, as a rule at least during the actuation of brake actuating element 64 below the threshold strength, the at least one master brake cylinder piston can be displaced in such a way that a volume of brake fluid can be displaced out of master brake cylinder 62. As a rule, at the beginning of its actuation path a brake force booster 68 has infinite boosting. In this region, there exists a negligible (possibly no) mechanical coupling between brake actuating element 64 and the at least one master brake cylinder piston. This can also be referred to as the absence of a (substantial) mechanical coupling between brake actuating element 64 and the brake system. In this region, the driver's braking force is not used for the actuation of master brake cylinder 62, i.e. for the displacement of the at least one master brake cylinder piston, but rather is used only for the controlling of brake force booster 68.

The beginning of the actuation path, in which the actuation strength not equal to zero is still below the threshold strength, is therefore also often referred to as the jump-in region. Outside the jump-in region, there exists a mechanical coupling between brake actuating element 64 and the master brake cylinder piston. Thus, the driver's braking force is used outside the jump-in region for the displacement of the master brake cylinder piston and thus for braking into the at least one wheel brake cylinder 53a, 53b, 54a, and 54b. This process can also be supported by the additional force of brake force booster 68.

The characteristic of brake force booster 68 can therefore be used for braking into master brake cylinder 62 without the presence of a (substantial) mechanical coupling/transmission of force between brake actuating element 64 and the master brake cylinder piston. Thus, the beginning of the actuation path, with an actuation strength not equal to zero but below the threshold strength, i.e. the jump-in region, can advantageously be used for a masking of a generator braking moment, as is explained further below.

Figure 2B:
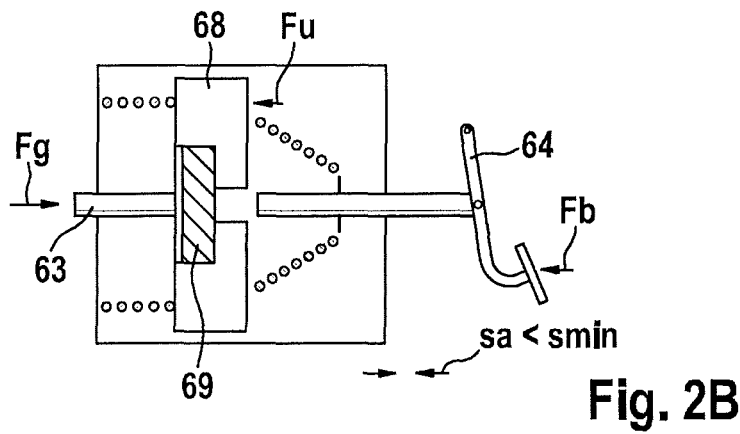
Figure 2C:
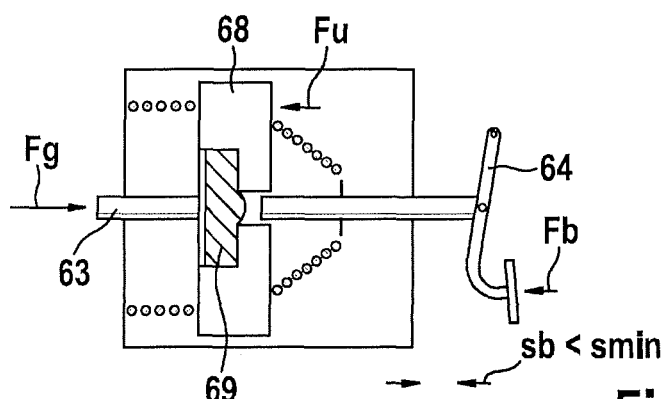
Figure 2D:
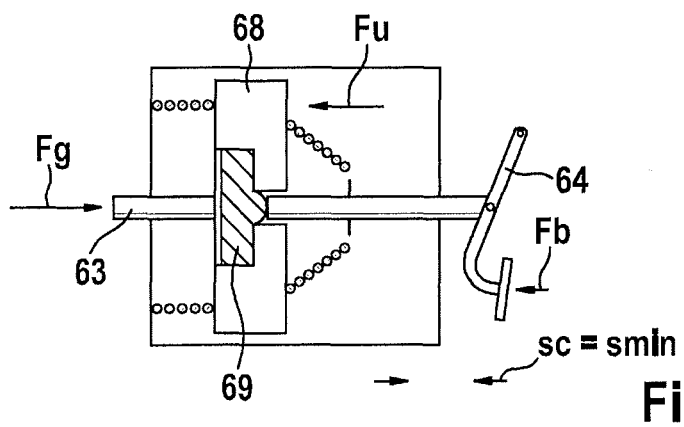

FIGS. 2B through 2D explain the advantageous situation of brake actuating element 64 on master brake cylinder 62.

As can be seen in FIG. 2B, when there is an actuation strength not equal to zero but below the threshold strength, for example when there is a brake actuation path sa not equal to zero but below a minimum brake actuation path smin, despite the presence of a driver's braking force Fb not equal to zero no force-transmitting connection is present between brake actuating element 64 and the at least one displaceable piston 63 of master brake cylinder 62, such as the rod piston. However, a supporting force Fu can be exerted on displaceable piston 63 of master brake cylinder 62 by brake force booster 68. Thus, despite the (almost) prevented/absent transmission of force between brake actuating element 64 and displaceable piston 63, displaceable piston 63 can be displaced by brake force booster 68. Correspondingly, a counterforce Fg is increased that counteracts the inward displacement of displaceable piston 63. However, due to the (almost) prevented transmission of force between brake actuating element 64 and displaceable piston 63 when there is an actuation below the threshold strength, the driver will not perceive counterforce Fg (regardless of its magnitude).

In the situation shown in FIG. 2C, brake actuating path sb is still below minimum brake path smin. Correspondingly, when actuating brake actuating element 64 the driver will not perceive counterforce Fg, which is increased in comparison with FIG. 2B.

A force-transmitting contact between brake actuating element 64 and the (at least one) displaceable piston 63 of master brake cylinder 62 is present only beginning from an actuation strength equal to the threshold strength, e.g. a brake actuation path sc equal to minimum brake path smin, as is shown in FIG. 2D. The force-transmitting contact can for example run via an elastic element, such as in particular a reaction disk 69.

Figure 2E:
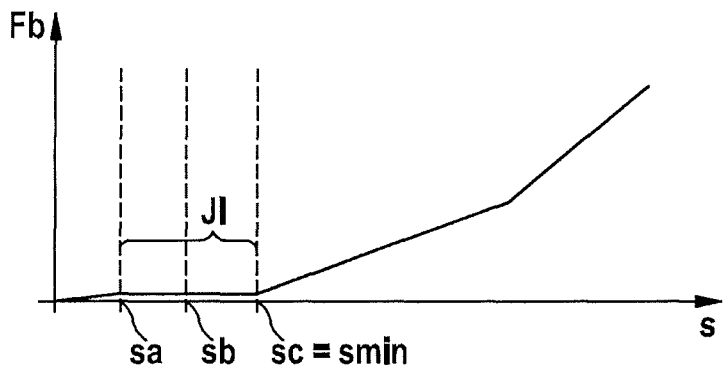
Figure 2F:
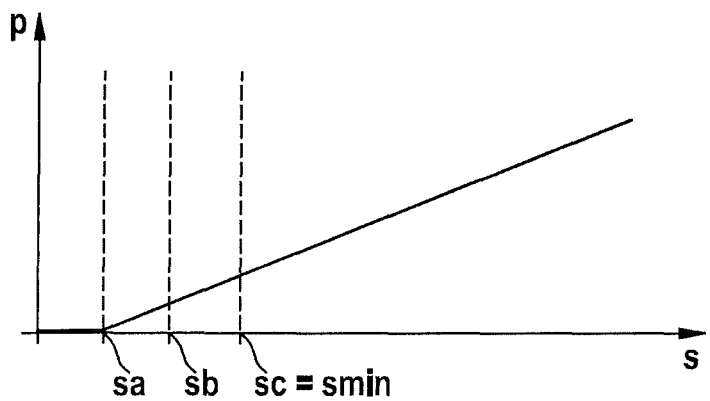
Figure 2G:
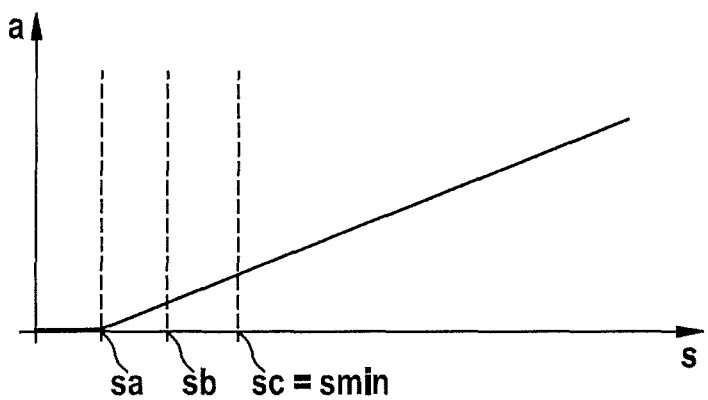

FIGS. 2E through 2G each show a coordinate system explaining the advantages of the preferred situation of brake actuating element 64 on master brake cylinder 62. In the coordinate systems of FIGS. 2E through 2G, the abscissas are brake actuating path s, shown as actuation strength. In FIG. 2E, the ordinate indicates the associated driver's braking force Fb. The pressure p that is present in master brake cylinder 62 when there is a brake actuation path s is indicated by the ordinate of FIG. 2F. The vehicle deceleration a executed when there is a brake actuation path s can be seen on the basis of the ordinate of FIG. 2G.

As can be seen on the basis of FIG. 2E, due to the advantageous situation of the brake actuating element on master brake cylinder 62, an actuation region is ensured that can be designated jump-in region JI. Within jump-in region JI, the driver can displace brake actuating element 64 with an (almost) constant driver's braking force Fb.

When in jump-in region JI, the driver brakes only indirectly into master brake cylinder 62. This can be realized by using a brake actuating element sensor to define a vehicle deceleration a, corresponding to brake actuation path s, as the target vehicle deceleration (see FIG. 2G). Subsequently, using brake force booster 68 the pressure p in master brake cylinder 62 can be set corresponding to the defined vehicle deceleration a/target vehicle deceleration (see FIG. 2F). This can also be described by saying that the driver brakes into master brake cylinder 62 in a path-controlled fashion.

In the following, further components of the specific embodiment of the brake system are described with reference to FIG. 2A. It is expressly to be noted that the components of the brake system described below are only an example of a possible embodiment of the advantageous brake system. A primary advantage of the brake system is that brake circuits 50 and 52 are not defined for a particular realization, or the use of particular components. Instead, brake circuits 50 and 52 can be modified with a high degree of elective freedom without impairing the advantages of the specific embodiment of the brake system.

Each of the brake circuits 50 and 52 is fashioned having a high-pressure switching valve 70a and 70b and a changeover valve 72a and 72b, in such a way that the driver can brake directly into wheel brake calipers 53a, 53b, 54a, and 54b via master brake cylinder 62. In first brake circuit 50, a first wheel inlet valve 74a is assigned to first wheel brake caliper 53a, and a second wheel inlet valve 75a is assigned to second wheel brake caliper 54a, in each case with a bypass line 76a running parallel thereto, and a check valve 77a situated in each bypass line 76a. In addition, a first wheel outlet valve 78a is assigned to first wheel brake caliper 53a, and a second wheel outlet valve 79a is assigned to second wheel brake caliper 54a. Correspondingly, in second brake circuit 52 a third wheel inlet valve 74b can also be assigned to third wheel brake caliper 53b, and a fourth wheel inlet valve 75b can also be assigned to third wheel brake caliper 54b. In each case, a bypass line 76, with a check valve 77b situated therein, can run parallel to each of the two wheel inlet valves 74b and 75b of the second brake circuit 52. In addition, in second brake circuit 52 a third wheel outlet valve 78b can be assigned to third wheel brake caliper 53b, and a fourth wheel outlet valve 79b can be assigned to fourth wheel brake caliper 54b.

Moreover, each of the brake circuits 50 and 52 includes a pump 80a and 80b whose intake side is connected to wheel outlet valves 78a and 79a or 78b and 79b, and whose conveyor side is oriented toward allocated changeover valve 72a or 72b. Brake circuits 50 and 52 also have a storage chamber 82a or 82b (e.g. a low-pressure storage chamber), situated between wheel outlet valves 78a and 79a or 78b and 79b and pump 80a or 80b, and an overpressure valve 84a or 84b situated between pump 80a or 80b and storage chamber 82a or 82b.

Pumps 80a and 80b can be situated on a common shaft 86 of a motor 88. Each of the pumps 80a and 80b can be realized as three-piston pumps. However, instead of a three-piston pump, a different type of pump can be used for at least one of pumps 80a and 80b. Differently realized modulation systems, such as pumps having more or fewer pistons, asymmetrical pumps, or gear pumps, may also be used.

The brake system can thus be realized as a modified standard modulation system, in particular as a six-piston ESP system. Moreover, each of the two brake circuits 50 and 52 can further include at least one pressure sensor 90, in particular situated on a supply line of a first wheel brake caliper 53a and/or third wheel brake caliper 53b used as a front axle brake caliper.

In the brake system equipped with control device 100, first wheel inlet valve 74a and third wheel inlet valve 74b can each be controlled by first valve control signal 12, and first wheel outlet valve 78a and third wheel outlet valve 78b can each be controlled by second valve control signal 14, and second wheel inlet valve 75a and fourth wheel inlet valve 75b can each be controlled by third valve control signal 16, and second wheel outlet valve 79a and fourth wheel outlet valve 79b can each be controlled by fourth valve control signal 18. Likewise, pumps 80a and 80b can be controlled by pump control signal 28. In addition, the brake system can also include a generator 102 that can be controlled by generator control signal 49. In this way, using the brake system that can be controlled at least to the first operating mode, a regenerative braking can be carried out while maintaining a good level of driver comfort.

Optionally, the brake system can also be controlled to the second operating mode by control device 100. Thus, already in the case of a light braking of the vehicle with an actuation strength below the threshold strength, generator 102 can be used to charge a vehicle battery. Because when there is an actuation strength below the threshold strength no force-transmitting contact is present between master brake cylinder 62 and brake actuating element 64, the driver will not sense any of the increase in counterforce Fg prevented by the controlling of the brake system to the second operating mode. Thus, even given a controlling of the brake system to the second operating mode, a good level of driver comfort is ensured.

After leaving the jump-in region, a counterforce Fg that is perceptible for the driver can be produced at brake actuating element 64 by using pumps 80a and 80b to take a volume from previously filled storage chambers 82a and 82b and to displace it into brake circuits 50 and 52. For this purpose, first wheel inlet valve 74a and third wheel inlet valve 74b are closed so that the volume from storage chambers 82a and 82b is displaced exclusively into second wheel brake caliper 54a and fourth wheel brake caliper 54b, thus causing a buildup of brake pressure. This pressure also acts on master brake cylinder 602, and represents the necessary counterforce Fg at brake actuating element 64 above the jump-in region. This brings about an advantageous brake actuation feeling for the driver.

Brake actuating element sensor 66 can be used to determine the target pressure specification. Because for each pedal path there exists an appropriate target pressure and thus an appropriate counterforce Fg, the corresponding pressure can be actively regulated at master brake cylinder 62. Using first wheel inlet valve 74a and third wheel inlet valve 74b, the pumped volume can be partly emptied into storage chambers 82a and 82b for pressure reduction. Thus, the volume for second wheel brake caliper 54a and for fourth wheel brake caliper 54b is always situated in brake circuits 50 and 52, and the volume of first wheel brake caliper 53a and of second wheel brake caliper 53b is always situated in storage chambers 82a and 82b. Thus, regenerative braking can also take place above the jump-in region, at an axle assigned to first wheel brake caliper 53a and to second wheel brake caliper 53b.

The brake system equipped with control device 100 can in particular also carry out the method steps described below. With regard to the embodiment of these method steps and their advantages, reference is therefore made to the description of the further Figures.

FIG. 3 shows a schematic overall representation of a second specific embodiment of the brake system.

The brake system schematically shown in FIG. 3 has the components already described above. Supplementing this, first wheel outlet valve 78a and third wheel outlet valve 78b are fashioned as (continuously) regulable outlet valves. With the aid of regulable first wheel outlet valve 78a and regulable third wheel outlet valve 78b, it is possible to displace brake fluid from first wheel brake caliper 53a and from third wheel brake caliper 53b into storage chambers 82a and 82b in a controlled manner. For this purpose, first wheel inlet valve 74a and third wheel inlet valve 74b are closed. With this supplementation, it is therefore possible to move smoothly from a purely hydraulic braking to an at least partly regenerative braking at the axle assigned to first wheel brake caliper 53a and to third wheel brake caliper 53b, preferably the front axle. Because the pressure in the brake circuit is not impaired by this procedure, the driver cannot notice this blending process.

The above-described brake systems can also execute active pressure buildup, i.e. braking demands without an actuation of brake actuating element 64, via pumps 80a and 80b, high-pressure switching valves 70a and 70b, and closed wheel outlet valves 78a, 78b, 79a, and 79b. In addition, the brake systems still have a comparatively good safety standard in the case of a circuit failure or vehicle electrical network failure. Additional functional limitations, such as a longer free travel or increased actuation force, do not have to be accepted in case of error in the described brake systems.

FIGS. 4A through 4D show four coordinate systems representing a first specific embodiment of the method.

For better clarity, the method is described using one of the above-described brake systems, the first wheel brake caliper and the third wheel brake caliper being assigned to a first axle fashioned as a front axle, and the second wheel brake caliper and the fourth wheel brake caliper being assigned to a second axle fashioned as a rear axle. However, the practicability of the method is not limited to the use of one of the above-described brake systems, or to such an assignment of the wheel brake calipers.

Figure 4A:
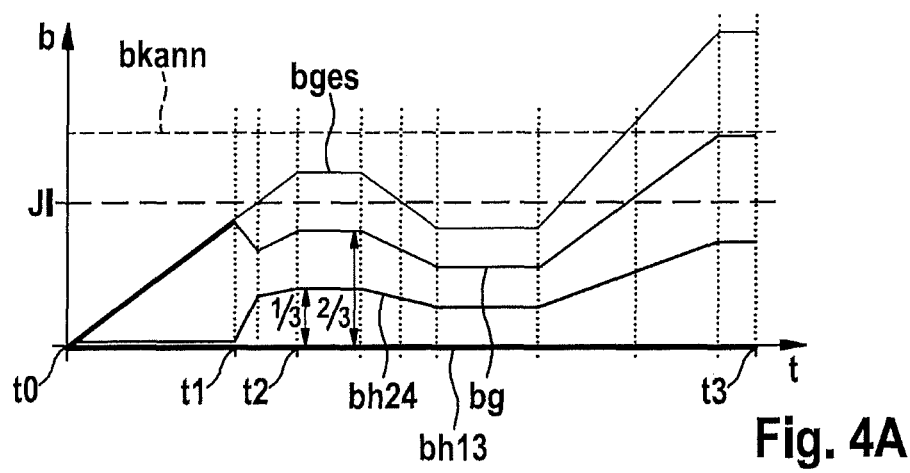
FIGS. 4A through 4D show four coordinate systems representing a first specific embodiment of the method.
Figure 4B:
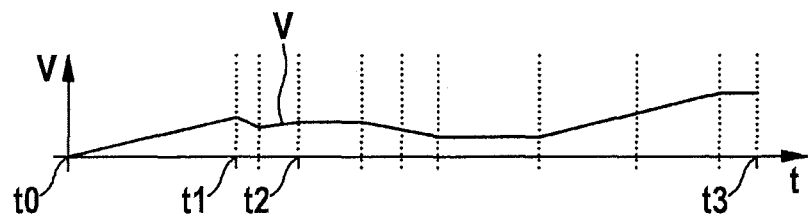
Figure 4C:
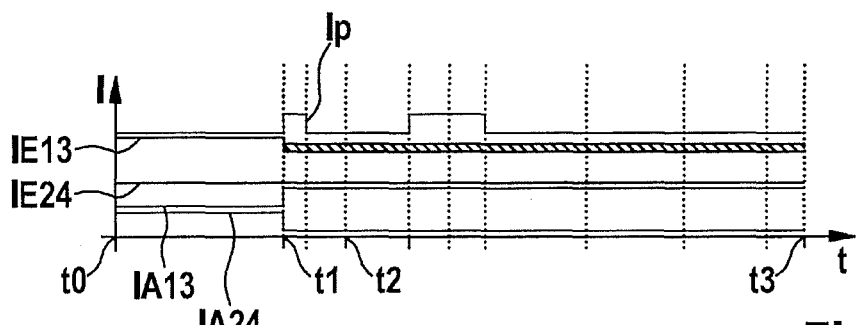
Figure 4D:
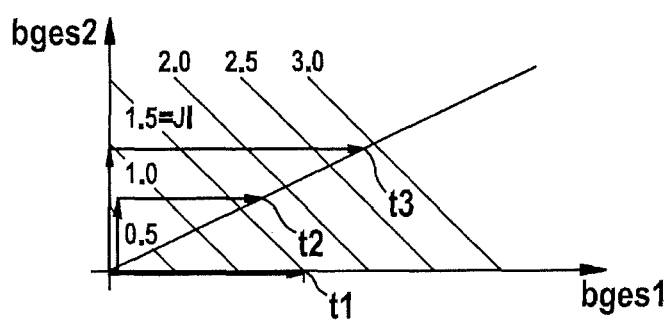
Figure 5A:
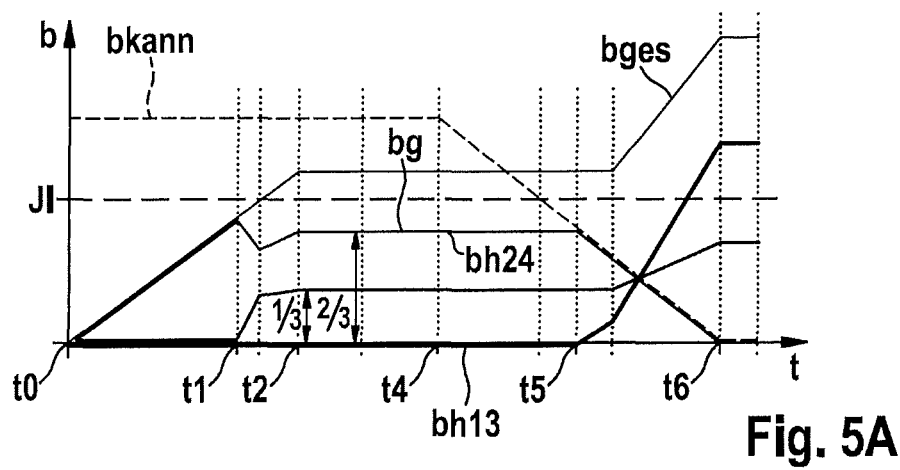
FIGS. 5A through 5D show four coordinate systems representing a second specific embodiment of the method.
Figure 5B:
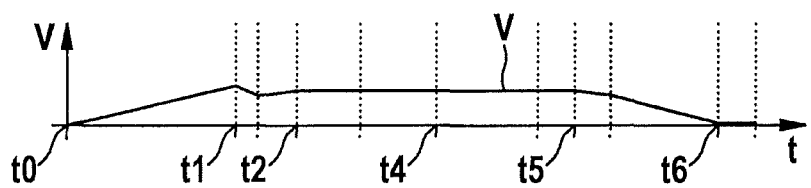
Figure 5C:
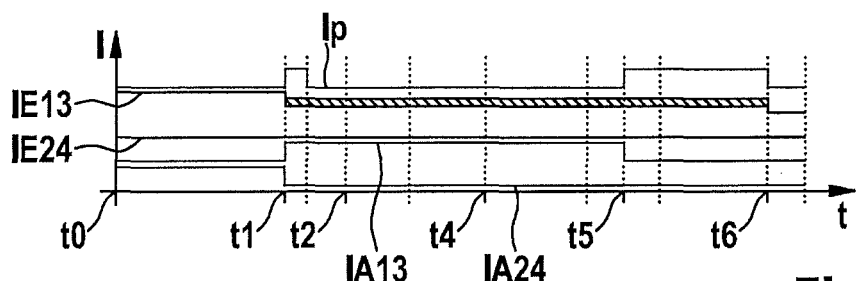
Figure 5D:
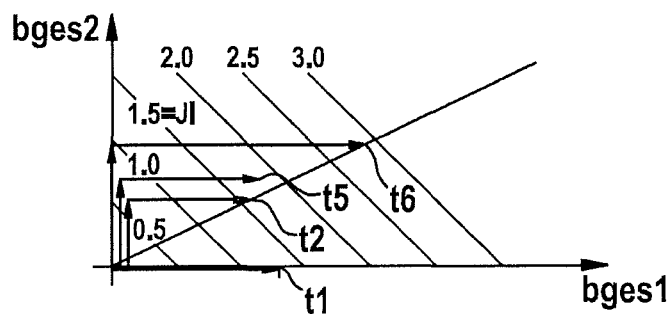

In the coordinate systems of FIGS. 4A through 4C, the abscissa is time axis t. The ordinate of the coordinate system in FIG. 4A indicates a braking moment b, while the ordinate of FIG. 4B corresponds to a displaced brake fluid volume V and the ordinate of the coordinate system of FIG. 4C indicates a current strength I. The abscissa of the coordinate system of FIG. 4D is a first partial braking moment bges1 exerted on the first axle, while the ordinate of the coordinate system of FIG. 4D represents a partial braking moment bges2 exerted on the second axle.

At a time t0, the brake actuating element of the brake system operated using the method is in its initial position/non-actuated position. Thus, up to time t0 the driver is not exerting any force on the brake actuating element.

Beginning at time t0, the driver exerts an increasing force on the brake actuating element, displacing it. However, the brake actuating element of the brake system actuated using the described method is situated on the master brake cylinder in such a way that, given an actuation strength of the actuation of the brake actuating element by the driver that is below a threshold strength, a transmission of force between the brake actuating element and at least one displaceable piston of the master brake cylinder is prevented. (With regard to the jump-in region that can be realized in this way, reference is made to the embodiments of FIGS. 2B through 2G.) In the method presented here, the driver exerts, at time t1 at the earliest, an actuation strength on the brake actuating element that is in the region of the threshold strength. Thus, the brake actuating element is in the jump-in region between times t0 and t1.

In order to use the jump-in region for charging a vehicle battery by a generator, during the method an actuation strength of the actuation of the brake actuating element is compared to a specified threshold strength.

Optionally, the actuation strength can also be compared to a specified minimum strength. In addition, a generator braking moment that is or can be exerted by a generator can also be compared to a specified minimum braking moment. If at least the actuation strength is below the threshold strength, or is between the minimum strength and the threshold strength, the brake system can be controlled to the above-described second operating mode. Preferably, the brake system is controlled to the second operating mode if the generator braking moment is also above the minimum braking moment. This ensures that the generator braking moment bkann that can currently be executed (possible generator braking moment) permits a generative braking. Between times t0 and t1, the brake system is thus controlled to the second operating mode.

In the second operating mode, the first wheel inlet valve and the third wheel inlet valve are controlled to the closed state, and the first wheel outlet valve and the third wheel outlet valve are controlled to the closed state, and the second wheel inlet valve and the fourth wheel inlet valve are controlled to the at least partly open state, and the second wheel outlet valve and the fourth wheel outlet valve are controlled to the at least partly open state. In a realization of the wheel inlet valves as currentlessly open valves, a first valve control signal IE13, having a current strength not equal to zero, is provided to the first wheel inlet valve and to the third wheel inlet valve, and a third valve control signal IA13 having a current strength equal to zero is provided to the second wheel inlet valve and to the fourth wheel inlet valve. If the wheel outlet valves are fashioned as currentlessly closed valves, a second valve control signal IE24 having a current strength equal to zero is outputted to the first wheel outlet valve and to the third wheel outlet valve, and a fourth valve control signal IA24 having a current strength not equal to zero is outputted to the second wheel outlet valve and to the fourth wheel outlet valve.

Through the opening of the second wheel inlet valve and of the second wheel outlet valve, as well as of the fourth wheel inlet valve and of the fourth wheel outlet valve, the brake fluid volume V pressed out of the master brake cylinder can be displaced into the storage chambers. Thus, despite an actuation of the brake actuating element by the driver, and an associated displacement of the at least one displaceable piston of the master brake cylinder, a buildup of brake pressure in the second wheel brake caliper and in the fourth wheel brake caliper can be prevented. Hydraulic brake moments bh24 of the second wheel brake caliper and of the fourth wheel brake caliper thus remain equal to zero. (Correspondingly, through the closing of the first wheel inlet valve and of the third wheel inlet valve it can be ensured that hydraulic brake moments bh13 of the first brake caliper and of the third brake caliper also remain equal to zero between times t0 and t1, in the case of a braking within the jump-in region.)

Thus, if a target overall braking moment bges specified by the driver via the actuation strength is smaller than a possible generator braking moment bkann that can be executed by the generator, the target overall braking moment bges requested by the driver can be applied as generator braking moment bg. This ensures a rapid charging of a vehicle battery that can be charged using the generator, even in the case of a light braking of the vehicle.

Beginning from/after time t1, the driver exceeds the jump-in region. After a determination that the actuation strength is above the threshold strength, or is close to the threshold strength, the brake system is controlled to the above-described first operating mode. This takes place by controlling the first wheel inlet valve and the third wheel inlet valve alternately to the at least partly open state and to the closed state, and by holding the first wheel outlet valve and the third wheel outlet valve in the at least partly open state, and by a controlling of the second wheel inlet valve and of the fourth wheel inlet valve to the at least partly open state and a controlling of the second wheel outlet valve and of the fourth wheel outlet valve to the closed state.

Given a realization of the wheel inlet valves as currentlessly open valves, a first valve control signal IE13, having a current strength alternating between zero and one, is provided to the first wheel inlet valve and to the third wheel inlet valve, and a third valve control signal IA13, having a current strength equal to zero, is provided to the second wheel inlet valve and to the fourth wheel inlet valve. If the wheel outlet valves are fashioned as currentlessly closed valves, a second valve control signal IE24 having a current strength not equal to zero is outputted to the first wheel outlet valve and to the third wheel outlet valve, and a fourth valve control signal IA24 having a current strength equal to zero is outputted to the second wheel outlet valve and to the fourth wheel outlet valve. In this way, despite the actuation strength not equal to zero, starting from time t1 a buildup of brake pressure in the first wheel brake caliper and in the third wheel brake caliper is prevented (bh13 equal to zero), while a brake pressure is built up in the second wheel brake caliper and in the fourth wheel brake caliper (bh24 not equal to zero).

In order to ensure that, given the presence of a transmission of force between the brake actuating element and the at least one displaceable piston of the master brake cylinder, the driver has a preferred (standard) brake actuation feeling, the brake fluid volume V displaced into the storage chamber can be pumped at least partly into the master brake cylinder, the second wheel brake caliper, and/or the fourth wheel brake caliper. The pumps of the two brake circuits can be activated for this purpose using a pump control signal lp having a current strength not equal to zero.

The displacement back of the volume V in order to ensure an advantageous brake actuation feeling for the driver starting from the presence of a force-transmitting contact between the brake actuating element and the displaceable piston of the master brake cylinder, or starting from a departure from the jump-in region, can for example be carried out in that, during the controlling of the brake system to the first operating mode, an actual pressure quantity relating to the brake pressure present in the second wheel brake caliper, in the fourth wheel brake caliper, and/or in the master brake cylinder, is determined or derived and is compared to a specified target pressure quantity. (Theoretically, given an actual pressure quantity greater than the target pressure quantity, the first wheel inlet valve and/or the third wheel inlet valve can be controlled to the at least partly open state, using first valve control signal IE13, in such a way that the brake pressure in the second wheel brake caliper is reduced by a pressure difference corresponding to a deviation of the actual pressure quantity from the target pressure quantity. This can be brought about while the brake pressure buildup of the first wheel brake caliper is prevented despite the actuation strength not equal to zero.) Correspondingly, in the case of an actual pressure quantity that is below the target pressure quantity, at least one pump can be controlled in such a way that a brake fluid volume corresponding to the deviation is pumped from a storage chamber into the first brake circuit. In this way, it is also possible to bring about an increase of a pressure present in the second wheel brake caliper, in the fourth wheel brake caliper, and/or in the master brake cylinder.

In this way, it can be ensured not only that the driver experiences a preferred (standard) brake actuation feeling starting from the presence of a force-transmitting contact between the brake actuating element and the displaceable piston of the master brake cylinder, or starting from a departure from the jump-in region, but also that a desired magnitude ratio can be set between generator braking moment bg and hydraulic braking moment bh24 of the second wheel brake caliper and of the fourth wheel brake caliper. For example, between times t2 and t3 the magnitude ratio between generator braking moment bg and hydraulic braking moment bh24 of the second wheel brake caliper and of the fourth wheel brake caliper, or between partial braking moment bges1 exerted on the first axle and partial braking moment bges2 exerted on the second axle, can be set at ⅔ to ⅓. This ensures an advantageous distribution of the braking moment to the axles of the vehicle despite a hydraulic braking moment bh13 of the first wheel brake caliper and of the third wheel brake caliper that is equal to zero, and an activated generator.

In the example of FIGS. 4A through 4D, the generator braking moment bkann that can be executed is constant over time, and is always greater than 66% of target overall braking moment bges specified by the driver. In the following, it is described that the method can also react to an increase or decrease in the generator braking moment.

FIGS. 5A through 5D show four coordinate systems representing a second specific embodiment of the method. (With regard to the abscissas and the ordinates, reference is made to the embodiments shown in FIGS. 4A through 4D.)

Beginning from time t4, generator braking moment bkann that can be executed decreases. Reasons for the decrease in executable generator braking moment bkann can be for example a current vehicle speed that is below a minimum speed that is advantageous for the use of the generator, and/or a comparatively high charge state of the battery.

Starting from time t5, executable braking moment bkann is less than 66% of target overall braking moment bges specified by the driver. However, the method can also react to this situation. For this purpose, the first wheel outlet valve and the third wheel outlet valve can be closed. For example, given a currentlessly closed realization, a third valve control signal IA13 equal to zero can be outputted to the first wheel outlet valve and to the third wheel outlet valve. Corresponding to the decrease in executable generator braking moment bkann, at the same time the at least one pump can convey a volume from the storage chambers back into the brake circuit. However, this volume does not cause an increase, or causes only a small increase, in the counterforce exerted on the brake actuating element, because the equivalent volume can be displaced, via the first wheel inlet valve and the third wheel inlet valve, into the first wheel brake caliper and into the third wheel brake caliper. The pressure in the brake circuits, and thus also the counterforce at the brake actuating element, remain constant. The additional volume causes an increase in hydraulic braking moment hb13 of the first wheel brake caliper and the third wheel brake caliper. Preferably, hydraulic braking moment hb13 of the first wheel brake caliper and of the third wheel brake caliper can be built up in such a way that, despite a limited usability of the generator, beginning from time t5 the sum of generator braking moment bg, hydraulic braking moment hb13 of the first wheel brake caliper and of the third wheel brake caliper, and hydraulic braking moment bh24 of the second wheel brake caliper and of the fourth wheel brake caliper corresponds to target overall braking moment bges (driver's desired braking).

Starting from time t6, the complete previously displaced volume is conveyed back into the respective brake circuit, and braking takes place purely hydraulically (bg equal to zero). However, the difference is not perceptible by the driver.

In the jump-in region as well, given a current driver's desired braking that is greater than executable generator braking moment bkann, braking can take place both regeneratively and hydraulically. If target overall braking moment bges exceeds executable generator braking moment bkann already in the jump-in region, the second wheel outlet valve and the fourth wheel outlet valve are again closed. Any further increase of target overall braking moment bges, and of the volume thereby displaced out of the master brake cylinder, results in a buildup of brake pressure in the second wheel brake caliper and in the fourth wheel brake caliper. In this case as well, the sum of the generator braking moment and hydraulic braking moment bh24, of the second wheel brake caliper and of the fourth wheel brake caliper, can correspond to target overall braking moment bges. Due to the absence of a mechanical coupling, the counterforce caused by the hydraulic pressure buildup is supported not by the brake actuating element, but rather only by the booster force. The change in the counterforce is therefore not perceptible by the driver during actuation of the brake actuating element.

Figure 6A:
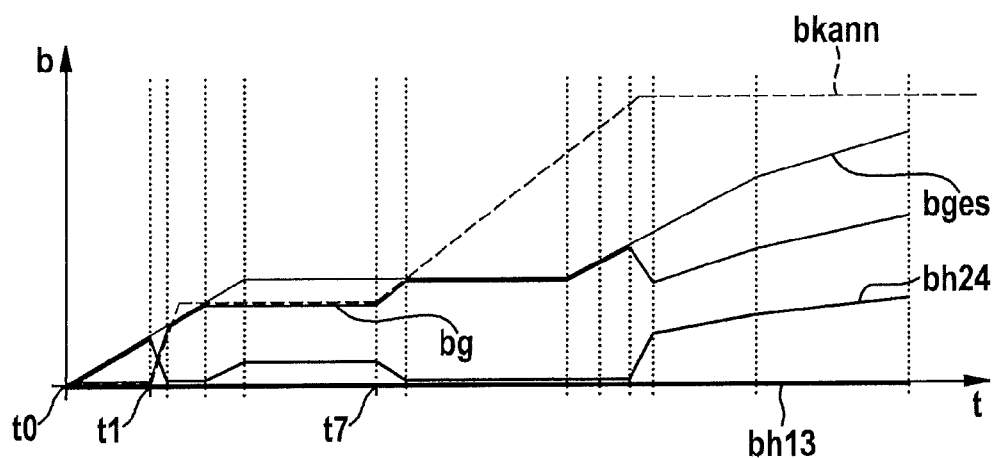
FIGS. 6A through 6C show three coordinate systems representing a third specific embodiment of the method.
Figure 6B:
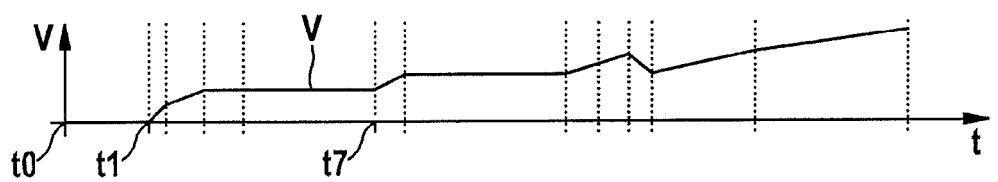
Figure 6C:
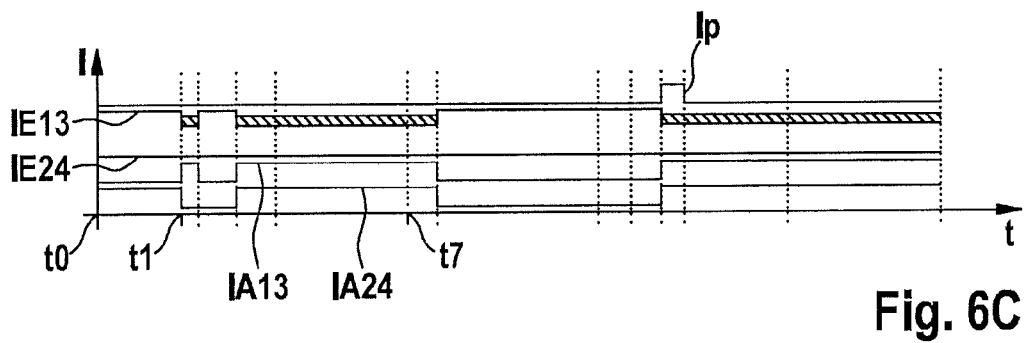

FIGS. 6A through 6C show three coordinate systems representing a second specific embodiment of the method. (With regard to the abscissas and the ordinates, reference is made to the embodiments of FIGS. 4A through 4C.)

If executable braking moment bkann (possible generator braking moment) increases during a braking, as is the case in the depicted exemplary embodiment beginning from time t7, then generator braking moment bg can be increased corresponding to the increase in executable generator braking moment bkann. This can be realized even though the driver has not carried out any change in his desired braking. The excessive deceleration can have the result that the driver reduces his actuation of the brake actuating element. However, in this process only hydraulic braking moment bh24 of the second wheel brake caliper and of the fourth wheel brake caliper are reduced. This causes a perceptible change in the pedal path deceleration characteristic, whereby however a faster charging of the vehicle battery, and thus an increased recuperation of energy, are realized.

As an alternative thereto, generator braking moment bg can also be kept constant. This operating strategy has the advantage of maximum comfort, because the driver will perceive no change in the pedal path, pedal force, or pedal path deceleration characteristic.

In an alternative specific embodiment of the methods described above, hydraulic braking can also take place on the front axle, while regenerative braking takes place on the rear axle.

The methods described above can in particular be part of a method for operating a brake system of a vehicle having a diagonal brake circuit configuration. However, their practicability is not limited to a vehicle having a diagonal brake circuit configuration.

What is claimed is:

1. A control device for a brake system of a vehicle, comprising:
   a controller configured to control the brake system to a first operating mode in which:
   upon an actuation of a brake actuating element situated on the brake system by a driver, a buildup of brake pressure is prevented at least in a first wheel brake caliper of a first brake circuit of the brake system, a first wheel inlet valve of the first wheel brake caliper being controlled at least at selected times to an at least partly open state during the first operating mode, and a first wheel outlet valve of the first wheel brake caliper being kept in an at least partly open state during the first operating mode; and
   the first wheel inlet valve is controlled at least at selected times during the first operating mode to a closed state, and a second wheel inlet valve of a second wheel brake caliper of the first brake circuit is controlled during the first operating mode to an at least partly open state, and a second wheel outlet valve of the second wheel brake caliper is controlled during the first operating mode to a closed state, in such a way that, while the buildup of brake pressure in the first wheel brake caliper is prevented when the brake actuating element is actuated, a brake pressure is built up in the second wheel brake caliper;
   wherein the controller is configured to control, during the controlling of the brake system to the first operating mode, the first wheel inlet valve from the closed state to the at least partly open state, taking into account a deviation of an actual pressure quantity relating to the brake pressure present in the second wheel brake caliper from a specified target pressure quantity, so that the brake pressure in the second wheel brake caliper is reduced by a pressure difference corresponding to the deviation, while the brake pressure buildup in the first wheel brake caliper is prevented during the exerted actuation of the brake actuating element.

2. The control device as recited in claim 1, wherein the controller is configured to output, during the controlling of the brake system to the first operating mode, a pump control signal to a pump device of the first brake circuit, taking into account the deviation of the actual pressure quantity from the specified target pressure quantity, and wherein the pump device is controlled based on the pump control signal in such a way that a brake fluid volume corresponding to the deviation is pumped by the pump device from a storage chamber into the first brake circuit to increase the brake pressure in the second wheel brake caliper.

3. The control device as recited in claim 1, further comprising:
   a first receiver device receiving a provided brake actuation strength signal relating to an actuation strength of the actuation of the brake actuating element; and
   a second receiver device receiving a provided generator braking moment signal relating to a generator braking moment to be exerted by a generator;
   wherein the controller is configured to: (i) at least one of compare the brake actuation strength signal to a specified threshold strength signal, and compare the generator braking moment signal to a specified minimum braking moment signal; and (ii) control the brake system to the first operating mode if at least one of the brake actuation strength signal is greater than the threshold strength signal and the generator braking moment signal is greater than the minimum braking moment signal, and control the brake system to at least one further operating mode if the brake actuation strength signal is not greater than the threshold strength signal and the generator braking moment signal is not greater than the minimum braking moment signal.

4. The control device as recited in claim 3, wherein the controller is configured to: (i) compare the brake actuation strength signal to a specified minimum strength signal; and (ii) control the brake system to a second operating mode if at least the brake actuation strength signal lies between the minimum strength signal and the threshold strength signal, wherein in the second operating mode the first wheel inlet valve is able to be controlled to the closed state, the first wheel outlet valve is able to be controlled to a closed state, the second wheel inlet valve is able to be controlled to the at least partly open state, and the second wheel outlet valve is able to be controlled to an at least partly open state.

5. The control device as recited in claim 3, wherein the controller is configured to: (i) determine the target pressure quantity relating to a target brake pressure in the second wheel brake caliper and to determine a target mode of the generator, taking into account the brake actuation strength signal and a received generator braking moment signal relating to a generator braking moment which is able to be exerted by the generator; and (ii) output to the generator a generator control signal corresponding to the determined target mode.

6. A brake system for a vehicle, comprising:
a diagonal brake circuit configuration; and
a controller configured to control the brake system to a first operating mode in which:
upon an actuation of a brake actuating element situated on the brake system by a driver, a buildup of brake pressure is prevented at least in a first wheel brake caliper of a first brake circuit of the brake system, a first wheel inlet valve of the first wheel brake caliper being controlled at least at selected times to an at least partly open state during the first operating mode, and a first wheel outlet valve of the first wheel brake caliper being kept in an at least partly open state during the first operating mode; and
the first wheel inlet valve is controlled at least at selected times during the first operating mode to a closed state, and a second wheel inlet valve of a second wheel brake caliper of the first brake circuit is controlled during the first operating mode to an at least partly open state, and a second wheel outlet valve of the second wheel brake caliper is controlled during the first operating mode to a closed state, in such a way that, while the buildup of brake pressure in the first wheel brake caliper is prevented when the brake actuating element is actuated, a brake pressure is built up in the second wheel brake caliper;
wherein the controller is configured to control, during the controlling of the brake system to the first operating mode, the first wheel inlet valve from the closed state to the at least partly open state, taking into account a deviation of an actual pressure quantity relating to the brake pressure present in the second wheel brake caliper from a specified target pressure quantity, so that the brake pressure in the second wheel brake caliper is reduced by a pressure difference corresponding to the deviation, while the brake pressure buildup in the first wheel brake caliper is prevented during the exerted actuation of the brake actuating element.

7. The brake system as recited in claim 6, wherein:
the brake system includes a brake actuating element situated on a master brake cylinder;
given an actuation of the brake actuating element with an actuation strength at least equal to a threshold strength corresponding to a threshold strength signal, a driver's braking force is transmitted to at least one displaceable piston of the master brake cylinder; and
given an actuation of the brake actuating element with an actuation strength below the threshold strength, a transmission of the driver's braking force to the at least one displaceable piston is prevented.

8. A method for operating a brake system of a vehicle, comprising:
controlling, using a controller, the brake system to a first operating mode in which, given an actuation of a brake actuating element situated on the brake system by a driver, a buildup of brake pressure is prevented at least in a first wheel brake caliper of a first brake circuit of the brake system, by controlling a first wheel inlet valve of the first wheel brake caliper at least at times to an at least partly open state during the first operating mode, and controlling a first wheel outlet valve of the first wheel brake caliper in an at least partly open state during the first operating mode;
controlling the first wheel inlet valve to a closed state at least at times during the first operating mode;
controlling a second wheel inlet valve of a second wheel brake caliper of the first brake circuit to an at least partly open state during the first operating mode; and
controlling a second wheel outlet valve of the second wheel brake caliper to a closed state during the first operating mode;
wherein a brake pressure is built up in the second wheel brake caliper in the first operating mode while the buildup of brake pressure in the first wheel brake caliper is prevented, and
wherein the controller is configured to control, during the controlling of the brake system to the first operating mode, the first wheel inlet valve from the closed state to the at least partly open state, taking into account a deviation of an actual pressure quantity relating to the brake pressure present in the second wheel brake caliper from a specified target pressure quantity, so that the brake pressure in the second wheel brake caliper is reduced by a pressure difference corresponding to the deviation, while the brake pressure buildup in the first wheel brake caliper is prevented during the exerted actuation of the brake actuating element.

9. The method as recited in claim 8, wherein:
an actual pressure quantity relating to the brake pressure present in the second wheel brake caliper is ascertained during the controlling of the brake system to the first operating mode;
the actual pressure quantity is compared to a specified target pressure quantity; and
if the actual pressure quantity is greater than the target pressure quantity, the first wheel inlet valve is controlled from the closed state to the at least partly open state in such a way that the brake pressure in the second wheel brake caliper is reduced by a pressure difference corresponding to a deviation of the actual pressure quantity from the target pressure quantity, while the buildup of brake pressure in the first wheel brake caliper is prevented during the actuation of the brake actuating element.

10. The method as recited in claim 9, wherein:
if the actual pressure quantity is below the target pressure quantity, a pump device of the first brake circuit is controlled in such a way that a brake fluid volume corresponding to the deviation of the actual pressure quantity from the target pressure quantity is pumped by the pump device from a storage chamber into the first brake circuit to increase the brake pressure in the second wheel brake caliper.

11. The method as recited in claim 9, wherein:
(i) at least one of a brake actuation strength of a brake actuating element is compared to a specified threshold strength, and a generator braking moment is compared to a specified minimum braking moment;
(ii) the brake system is controlled to the first operating mode if at least one of the brake actuation strength is greater than the threshold strength and the generator braking moment is greater than the minimum braking moment; and
(iii) the brake system is controlled to at least one further operating mode if the brake actuation strength is not greater than the threshold strength and the generator braking moment is not greater than the minimum braking moment.

12. The method as recited in claim 11, wherein:
(i) the brake actuation strength is compared to the specified minimum strength; and
(ii) the brake system is controlled to a second operating mode if at least the brake actuation strength is between the minimum strength and the threshold strength, wherein in the second operating mode the first wheel inlet valve controlled to the closed state, the first wheel outlet valve is controlled to a closed state, the second wheel inlet valve is controlled to the at least partly open state, and the second wheel outlet valve is controlled to an at least partly open state.

\* \* \* \* \*